US012080264B2

(12) United States Patent
Su et al.

(10) Patent No.: US 12,080,264 B2
(45) Date of Patent: Sep. 3, 2024

(54) FLEXURAL WAVE ABSORPTION SYSTEM

(71) Applicant: Toyota Motor Engineering & Manufacturing North America, Inc., Plano, TX (US)

(72) Inventors: Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabuhiki Kaisha, Toyota (JP)

( * ) Notice: Subject to any disclaimer, the term of this patent is extended or adjusted under 35 U.S.C. 154(b) by 294 days.

(21) Appl. No.: 17/748,555

(22) Filed: May 19, 2022

(65) Prior Publication Data

US 2023/0377546 A1 Nov. 23, 2023

(51) Int. Cl.
*G10K 11/172* (2006.01)
*G10K 11/162* (2006.01)

(52) U.S. Cl.
CPC .......... *G10K 11/172* (2013.01); *G10K 11/162* (2013.01)

(58) Field of Classification Search
CPC ............................ G10K 11/172; G10K 11/162
USPC ................................................ 181/207, 208
See application file for complete search history.

(56) References Cited

U.S. PATENT DOCUMENTS 2,541,159 A * 2/1951 Geiger ...................... E04B 1/84 181/208
3,087,567 A * 4/1963 Kurtze ................. G10K 11/172 181/208
4,373,608 A * 2/1983 Holmes ..................... F16F 7/10 181/208
4,778,028 A * 10/1988 Staley .................. G10K 11/168 181/290
6,478,110 B1 * 11/2002 Eatwell .................. G10K 11/16 181/207
8,025,124 B2 * 9/2011 Levit ....................... F16F 7/108 181/284
8,172,036 B2 * 5/2012 Tanielian ............. G10K 11/162 428/116
8,960,365 B2 * 2/2015 Sheng .................. G10K 11/172 181/207
10,482,865 B2 * 11/2019 Yang .................... G10K 11/172

(Continued)

FOREIGN PATENT DOCUMENTS

CN 106023979 A * 10/2016 ........... G10K 11/172
JP 2016109283 A 6/2016

OTHER PUBLICATIONS

Cao, L. et al., “Perfect absorption of flexural waves induced by bound state in the continuum”, Extreme Mechanics, Elsevier, Letters 47, 101364 (2021) pp. 1-17.

(Continued)

*Primary Examiner* — Jeremy A Luks
(74) *Attorney, Agent, or Firm* — Christopher G. Darrow; Darrow Mustafa PC

(57) ABSTRACT

A flexural wave absorption system may include a pair of resonators disposed on the structure and separated from each other by a separation distance. The pair of resonators are arranged on the structure in a direction substantially similar to the direction of the flexural wave acting on the structure. As to the separation distance, this distance may be approximately one-quarter of the wavelength of the flexural wave acting on the structure.

19 Claims, 5 Drawing Sheets

(56) References Cited

U.S. PATENT DOCUMENTS

| | | | | |
|---|---|---|---|---|
| 10,854,183 | B2 * | 12/2020 | Yamazoe | G10K 11/16 |
| 11,021,870 | B1 * | 6/2021 | McKnight | E04B 1/84 |
| 11,158,299 | B2 * | 10/2021 | Chunren | G10K 11/162 |
| 11,512,756 | B1 * | 11/2022 | Sterling | F16F 7/10 |
| 2013/0087407 | A1 * | 4/2013 | McKnight | G10K 11/172<br>181/287 |
| 2016/0027427 | A1 * | 1/2016 | Yang | G10K 11/172<br>181/286 |
| 2019/0120316 | A1 * | 4/2019 | Chang | F16F 7/104 |
| 2020/0160830 | A1 * | 5/2020 | Lee | G10K 11/20 |
| 2020/0180523 | A1 * | 6/2020 | Chang | G10K 11/162 |
| 2022/0051650 | A1 * | 2/2022 | Lee | G10K 11/172 |
| 2022/0112931 | A1 * | 4/2022 | Lee | F16F 7/116 |
| 2022/0190231 | A1 * | 6/2022 | Li | F16F 15/005 |
| 2022/0214312 | A1 * | 7/2022 | Lee | G01N 29/11 |
| 2022/0244221 | A1 * | 8/2022 | Li | G06N 3/044 |
| 2022/0285604 | A1 * | 9/2022 | Li | H10N 30/304 |
| 2023/0042380 | A1 * | 2/2023 | Li | F16F 7/104 |
| 2023/0167877 | A1 * | 6/2023 | Li | F16F 7/1005<br>188/378 |

OTHER PUBLICATIONS

Ji, H. et al., "Investigations on flexural wave propagation and attenuation in a modified one-dimensional acoustic black hole using a laser excitation technique", Mechanical Systems and Signal Processing 104, (2018) pp. 19-35.

Li, X. et al., "A self-adaptive metamaterial beam with digitally controlled resonators for subwavelength broadband flexural wave attenuation", Smart Materials and Structures 27, 045015, (2018) pp. 1-13.

Liu, Y. et al., Design guidelines for flexural wave attenuation of slender beams with local resonators, Physics Letters A 362, (2007) pp. 344-347.

Li, X. et al., "An active meta-layer for optimal flexural wave absorption and cloaking", Mechanical Systems and Signal Processing 149, 107324 (2021) pp. 1-13.

Cao, L. et al., "Flexural wave absorption by lossy gradient elastic metasurface", Journal of the Mechanics and Physics of Solids 143, (Oct. 2020) 104052, pp. 1-59.

Chen, Y. et al., "A Programmable Metasurface for Real Time Control of Broadband Elastic Rays." Smart Materials and Structures 27, (2018) 115011, pp. 1-19.

* cited by examiner

FLEXURAL WAVE ABSORPTION SYSTEM

TECHNICAL FIELD

The present disclosure generally relates to systems for absorbing flexural waves acting upon a structure.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Flexural waves, sometimes referred to as bending waves, deform the structure transversely as they propagate. Flexural waves are more complicated than compressional or shear waves and depend on material and geometric properties. Airborne noises can be created by flexural waves when an object comes into contact with a structure subjected to a flexural wave. Flexural vibrations of thin structures, such as beams, plates, and shells are the most common source of noise caused by flexural waves.

To reduce noise caused by flexural waves, traditional sound absorption methods have been utilized, including installing sound absorbing materials that absorb radiated sound, applying damping materials to reduce vibration, and/or adding high mass structures to prevent the passage of vibrations. However, these traditional sound absorption methods only reduce the airborne noise and do not significantly impact the flexural wave, which is the root cause of the airborne noise. As a result, noise may still be transmitted to other locations through the structure.

SUMMARY

This section generally summarizes the disclosure and is not a comprehensive disclosure of its full scope or all its features.

In one example, a system for absorbing a flexural wave acting on a structure includes a pair of resonators disposed on the structure and separated from each other by a separation distance. The pair of resonators are arranged on the structure in a direction substantially similar to the direction of the flexural wave acting on the structure. As to the separation distance, this distance may be approximately one-quarter of the wavelength of the flexural wave acting on the structure.

In another example, a system for absorbing a flexural wave acting on a structure includes at least one elongated slot formed within the structure and extending in a direction substantially similar to the direction of the flexural wave acting on the structure. The at least one elongated slot defines a channel located between the at least one elongated slot and either another elongated slot or perimeter of the structure. A pair of resonators are disposed on the channel are and separated from each other by a separation distance and generally are arranged in a direction substantially similar to the direction of the flexural wave acting on the structure. Like before, the separation distance may be approximately one-quarter of the wavelength of the flexural wave acting on the structure.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are different examples of flexural wave absorption systems that can substantially absorb a flexural wave in a beam or plate-like structure. When the structure is a beam, the flexural wave absorption system may include a pair of resonators disposed on the beam in a substantially similar direction to the flexural wave acting on the beam. The resonators may be separated from one another at a distance that is approximately one-quarter of the wavelength of the flexural wave acting on the beam.

Each resonator forming the pair of resonators may be similar to one another. In one example, the resonators include a solid member acting as a mass and a flexible member attached to the solid member that acts as a spring and damper. Generally, the resonators may have a resonant frequency that is substantially similar, but may vary slightly, from the frequency of the flexural wave acting on the beam. In one example, the natural frequency of the resonators is approximately 5% greater than the frequency of the flexural wave acting on the beam. This frequency shift can be explained because the beam or plate, while an elastic structure, has some stiffness that must be accounted for.

The flexural wave absorption system can also absorb flexural waves acting on a plate-like structure. When the structure is a plate, the structure includes one or more elongated slots that define a channel within the structure that is located between the elongated slots or between an elongated slot and an edge of the plate. A pair of resonators are disposed on the channel in a substantially similar direction to the direction of the flexural wave acting upon the plate. Generally, the length of the channel defines a direction that is also substantially similar to the direction of the flexural wave acting upon the plate as well.

Like before, the distance between the resonators forming the pair is generally one-quarter of the wavelength of the flexural wave acting upon the plate and the resonant frequency of the resonators is substantially similar to the frequency of the flexural wave acting upon the plate but may vary slightly. As explained previously, the resonant frequency of the resonators may be approximately 5% greater than the frequency of the flexural wave acting on the plate.

Figure 1:
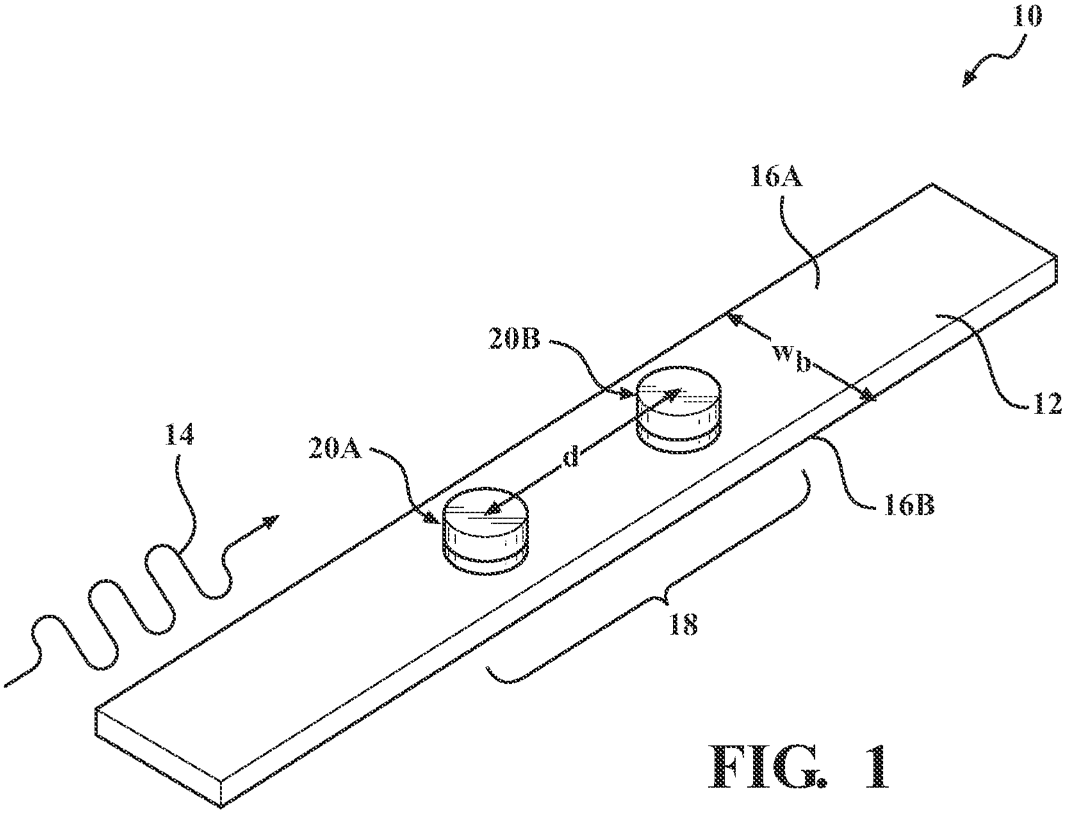
FIG. 1 illustrates one example of a flexural wave absorption system that includes a pair of resonators mounted to a structure that is in the form of a beam.
Figure 2:
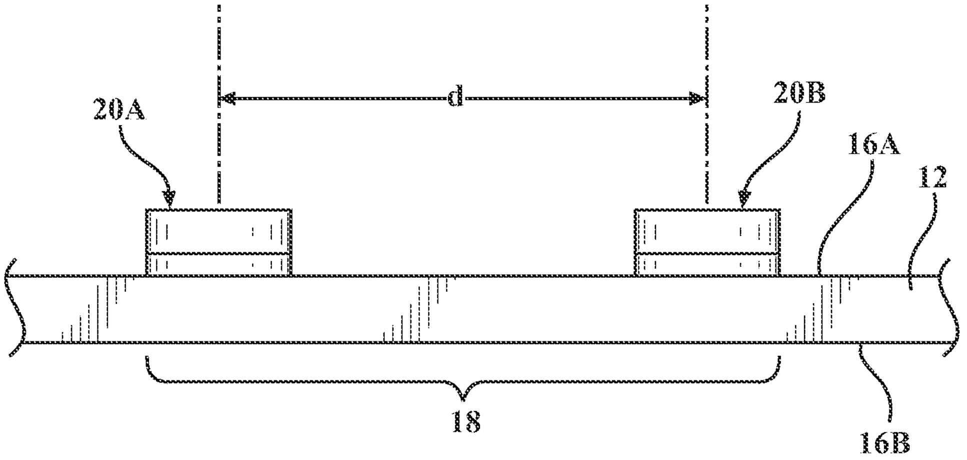
FIG. 2 illustrates a more detailed view of the pair of resonators mounted to the structure of FIG. 1.

Referring to FIGS. 1 and 2, illustrated is one example of a flexural wave absorption system 10. As will be explained, the flexural wave absorption system 10 can substantially absorb a flexural wave 14 acting upon the structure. In this example, the structure is in the form of a beam 12. The beam 12 can vary from application to application and can be made of different types of materials and have different types of dimensions, such as length, width, and thickness. Generally, the longer portion of the beam is the length, while the shorter portion of the beam is the width $w_b$.

The beam 12 includes a top side 16A and a bottom side 16B that generally oppose one another. In this example, a pair of resonators 18, including a first resonator 20A and a second resonator 20B, are disposed on the top side 16A of the beam 12. Generally, the first resonator 20A and the second resonator 20B are disposed on the beam 12 in a substantially similar direction of travel of the flexural wave 14 acting upon the beam 12. In some cases, the direction that the first resonator 20A and the second resonator 20B are disposed on the beam 12 may be such that they are substantially similar to a direction defined by the length of the beam 12.

The first resonator 20A and the second resonator 20B are generally separated from each other by a separation distance d. The separation distance d is generally dependent on the wavelength of the flexural wave 14 acting upon the beam 12 and may be approximately one-quarter of the wavelength of the flexural wave 14. Depending on what frequency range of flexural waves are targeted for absorption, the separation distance d can vary accordingly.

Figure 3:
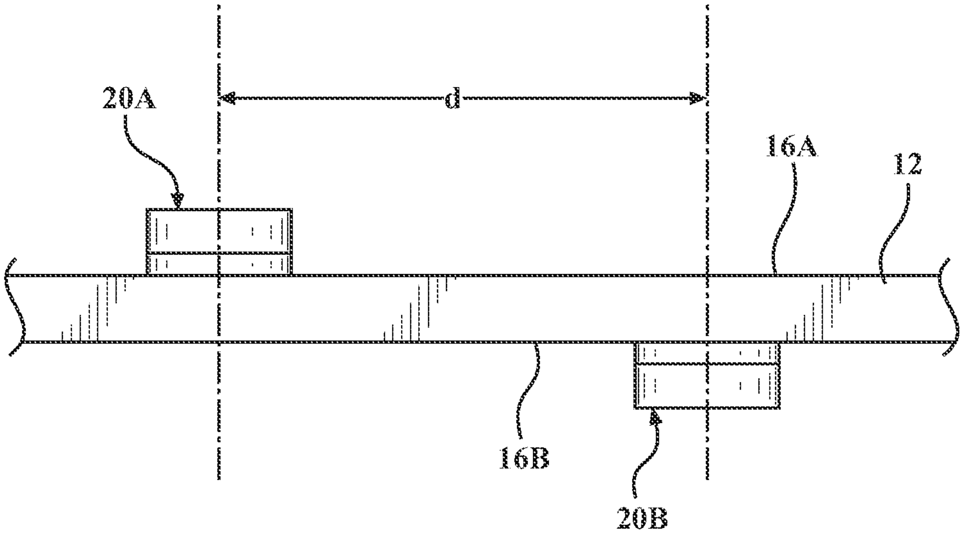
FIG. 3 illustrates another example of the pair of resonators mounted to the structure of FIG. 1, wherein one resonator is disposed to one side of the structure and another resonator is disposed of on the other side of the structure.

As mentioned previously and shown in FIGS. 1 and 2, the pair of resonators 18 may be disposed on the top side 16A of the beam 12. However, it should be understood that the pair of resonators 18 may be alternatively disposed on the bottom side 16B of the beam 12. Further still, one resonator of the pair of resonators 18 may be disposed of on the top side 16A, while the other resonator of the pair of resonators 18 may be disposed of on the bottom side 16B. For example, referring to FIG. 3, illustrated is an example wherein the first resonator 20A is disposed of on the top side 16A of the beam 12 and the second resonator 20B is disposed of on the bottom side 16B of the beam 12. Notably, the separation distance d remains the same regardless of the configuration. As mentioned before, the separation distance d depends on the frequency of the flexural wave 14 to be absorbed and is generally one-quarter of the wavelength of the flexural wave 14.

Figure 4A:
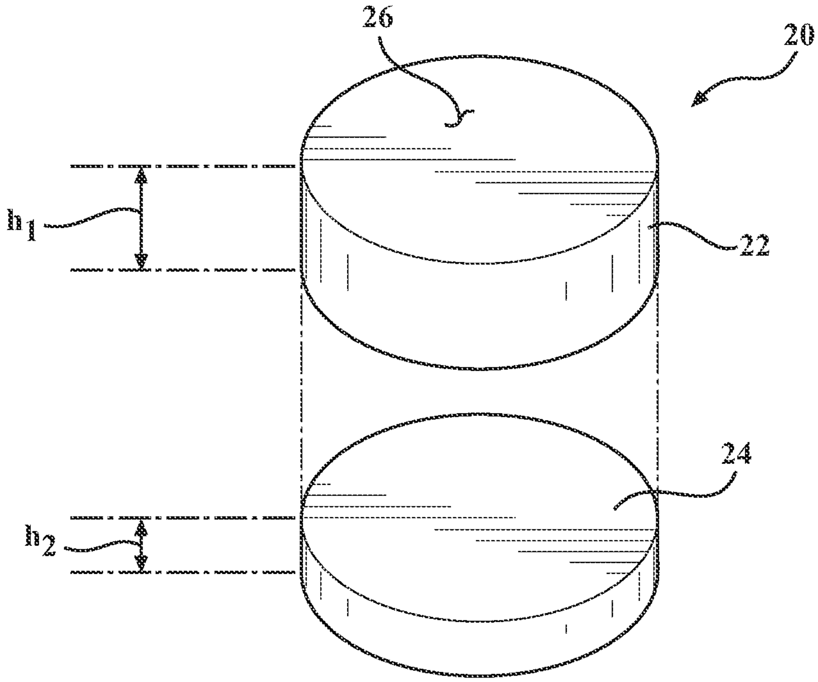
FIGS. 4A-4C illustrate different examples of resonators that can be utilized with the flexural wave absorption system.

Generally, the first resonator 20A and the second resonator 20B are substantially similar to each other, such that they have a similar frequency response. As such, they may also be physically similar to each other. For example, referring to FIG. 4A, illustrated is a more detailed view of a resonator 20 that may be similar to the first resonator 20A and/or the second resonator 20B or any of the other resonators described in this description, such as the resonators 120A-120G that will be described later. Here, the resonator 20 includes a solid member 22 and a flexible member 24. Generally, the solid member 22 acts as a mass in a mass-spring-damper system and may be made of a rigid material, such as steel, iron, aluminum, ceramics, plastics, and the like. However, the solid member 22 may be made of any suitable material that allows the solid member 22 to act as a mass in a mass-spring-damper system.

As to the flexible member 24, the flexible member 24 acts as a spring and damper in a mass-spring-damper system and may be made of a flexible material, such as rubber and soft plastics, such as thermoplastic elastomers, and/or thermoplastic polyurethane. However, the flexible member may be made of any suitable material that allows the flexible member 24 to act as a spring and damper in a mass-spring-damper system.

The solid member 22 may be attached to the flexible member 24 using adhesives. However, the solid member 22 may be attached to the flexible member 24 using a number of different methodologies, such as press-fitting, over-molding, crimping, and/or the use of retainers, such as screws. The flexible member 24 may be attached to the beam 12 using similar methodologies, such as adhesives, press-fitting, over-molding, crimping, and/or the use of retainers, such as screws. When the resonator 20 is attached to the beam 12, the flexible member 24 is located between the beam 12 and the solid member 22.

The resonator 20 may also have a cross-sectional area 26 that may be based on the width $w_b$ of the beam 12 of FIG. 1. Moreover, cross-sectional areas of the solid member 22 and/or the flexible member 24 may be directly proportional to the width $w_b$ of the beam 12 of FIG. 1. In particular, the characteristic dimension of the cross-sectional area 26 is between 15% to 20% of the width $w_b$ of the beam 12 of FIG. 1.

The resonator 20 may have a resonant frequency that is substantially similar to the resonant frequency of the flexural wave acting upon the structure to which the resonator 20 is attached. Moreover, when using a pair of resonators, such as the resonators 20A and 20B of FIG. 1, both the resonators 20A and 20B will have substantially similar resonant frequencies, which are substantially similar to the frequency of the flexural wave that is acting upon the structure. However, it should be understood that the similarity of the resonant frequencies of the resonators 20A and 20B and that of the flexural wave 14 may vary slightly (approximately 20% or less) to accommodate for the stiffness of the flexible member 24. For example, the resonant frequencies of the resonators 20A and 20B may be greater than the frequency of the flexural wave. In one particular example, the resonant frequencies of the resonators 20A and 20B may be approximately 5% greater than the frequency of the flexural wave 14.

Since the resonator 20 is a spring-mass-damper system, the lumped mass M of the solid member 22 may be represented as $M=\rho Ah_1$, wherein $\rho$ is the density of the material that makes up the solid member 22, A is the cross-sectional area of the resonator 20 (in particular, the cross-sectional area of the solid member 22), and $h_1$ is the height of the solid member 22. Since the mass of the flexible member 24 may be negligible, the mass of the solid member 22 could be taken as the mass of the resonator 20.

The lumped stiffness of the resonator 20 may be represented as $\kappa=EA/(\beta h_2)$, where E is the Young's modulus of the material that makes up the flexible member 24, A is the cross-sectional area of the resonator 20 (in particular, the cross-sectional area of the flexible member 24), and $h_2$ is the height of the flexible member 24. The damping property C of the material that makes up the flexible member 24 comes from the viscous damping in the material, which can be modeled as the imaginary part of Young's modulus.

Figure 4B:
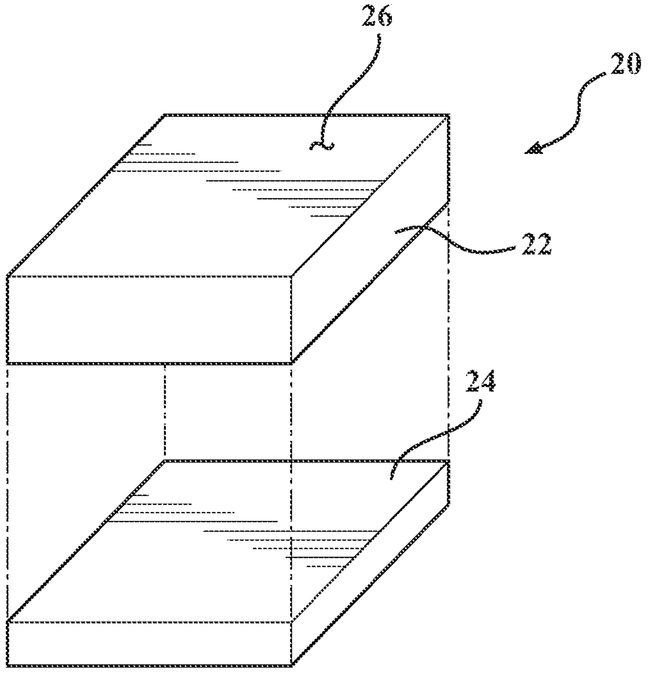
Figure 4C:
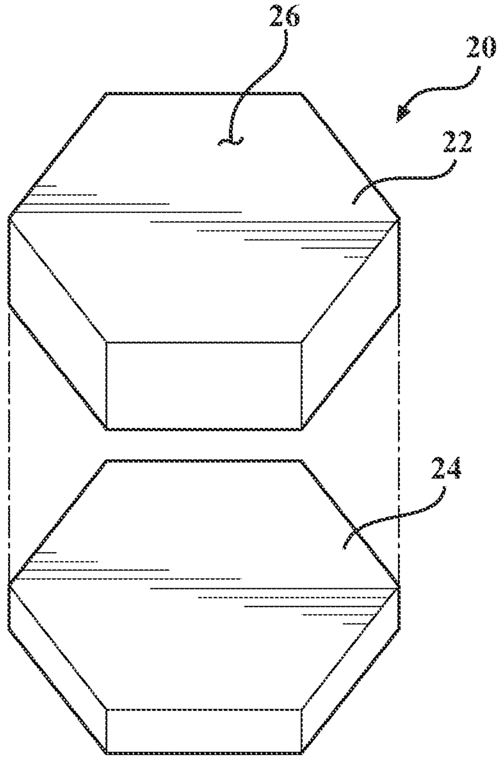

It should be understood that the overall shape of the resonator 20 can vary from application to application. For example, FIG. 4A illustrates that the resonator 20 is substantially cylindrical in shape, wherein both the solid member 22 and the flexible member 24 are cylindrical, giving the both the solid member 22 and the flexible member 24 substantially circular cross-sectional areas. However, the resonator 20 can take other shapes as well. For example, FIG. 4B illustrates the resonator 20 as being cubic in shape. FIG. 4C illustrates the resonator 20 is being hexagonal in shape. Again, the examples given in FIGS. 4A-4C are merely examples, and the resonator 20 can vary significantly. Further, it should be understood that resonators of different shapes can be utilized to form the pair of resonators 18. For example, one resonator could be cylindrical, while the other could be cubic. However, the frequency response of both resonators may be substantially similar.

Returning to FIG. 1, upon incidence of the flexural wave 14 such that it acts upon the beam 12, the vibrations of the resonators 20A and 20B will be excited. When the frequency of the flexural wave 14 is substantially similar to the resonant frequency of the resonators 20A and 20B, the resonators 20A and 20B vibrate up and down with high amplitude. The resonators 20A and 20B are treated as one unit. The monopole and dipole resonances may occur at the same frequency by tuning the size of resonators 20A and 20B and the distance d between them.

Moreover, when the resonators 20A and 20B are subject to the flexural wave 14, the monopole and dipole responses cancel each other in a backward direction so that there is no reflection. While the resonators 20A and 20B have constructive interference in the forward direction resulting in a scattered forward wave, the forward scattered wave cancels the incident wave in the forward direction beyond the resonators 20A and 20B. In this way, the flexural wave 14 is fully absorbed by the resonators 20A and 20B.

Figure 5:
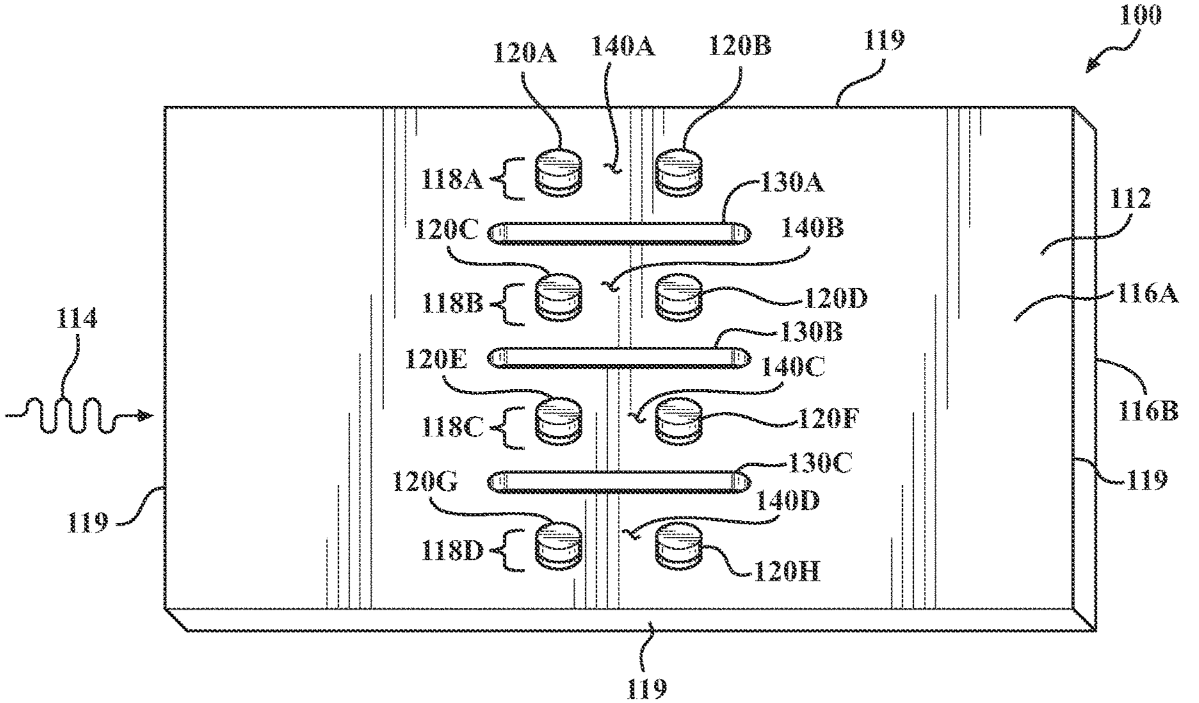
FIG. 5 illustrates another example of a flexural wave absorption system that includes pairs of resonators disposed on a plate-like structure on channels defined by elongated slots.
Figure 6:
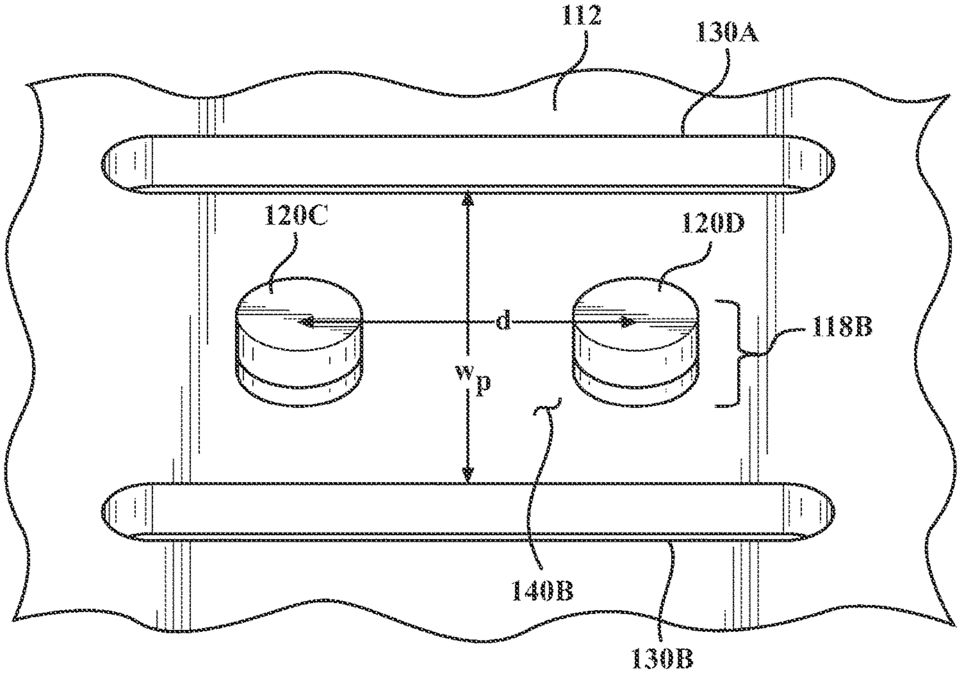
FIG. 6 illustrates a more detailed view of one pair of resonators of FIG. 5 disposed on the channel.

As mentioned before, the flexural wave absorption system 10 of FIG. 1 is incorporated within the beam 12 to absorb the flexural wave 14 acting upon the beam 12. However, similar principles can also be applied to absorbing a flexural wave acting upon a structure that is a plate. Plates differ from beams in that plates are significantly wider than beams. As such, there are some difficulties with absorbing flexural waves acting upon plates. Nevertheless, referring to FIGS. 5 and 6, illustrated is one example of a flexural wave absorption system 100 that can absorb a flexural wave 114 acting upon a plate 112.

The plate 112 is a structure that includes a top side 116A and a bottom side 116B. Similar to the beam 12 of FIG. 1, the plate 112 can be made out of any one of a number of different materials and can vary in dimensions significantly. The plate 112 generally has a perimeter 119 that defines the outer edge of the plate 112 and extends around the plate 112.

Here, the plate 112 includes elongated slots 130A-130C formed within the plate 112 that have channels 140A-140D defined between the elongated slots 130A-130C and/or the perimeter 119. Each of the elongated slots 130A-130C may either partially or completely pass through the thickness of the plate 112. In this example, three elongated slots 130A-130C have been defined within the plate 112. However, it should be understood that the number of elongated slots 130A-130C can vary based on the size and shape of the plate 112.

Moreover, the channel 140A is defined between the elongated slot 130A and the perimeter 119, the channel 140B is defined between elongated slot 130A and the elongated slot 130B, the channel 140C is defined between the elongated slot 130B and the elongated slot 130C, and the channel 140D is defined between the elongated slot 130C and the perimeter 119. Generally, the channels 140A-140D have widths $w_p$ that are substantially similar. Disposed within the channels 140A-140D are pairs of resonators 118A-118D, respectively.

With particular attention to FIG. 6, illustrated is a more detailed view of the channel 140B formed between elongated slot 130A and the elongated slot 130B. It should be understood that the description provided of the channel 140B can be equally applied to the other channels 140A, 140C, and 140D. Here, disposed on the channel 140B are pair of resonators 118B that include a first resonator 120C and a second resonator 120D. It should be understood that the first resonator 120C and the second resonator 120D may be similar to the resonators 20A and 20B, shown in FIGS. 1 and 2 and previously described. As such, any description regarding the resonators 20A and 20B is equally applicable to the first resonator 120C and the second resonator 120D. Further still, any description regarding the resonators 20A and 20B is also applicable to any of the other resonators forming the pairs of resonators 118A-118D.

The first resonator 120C and the second resonator 120D are separated by a separation distance d. Like before, separation distance d is generally dependent on the wavelength of the flexural wave 114 acting upon the plate 112 and may be approximately one-quarter of the wavelength of the flexural wave 114 acting upon the plate 112. Depending on what frequency range of flexural waves are targeted for absorption, the separation distance d can vary accordingly.

The width $w_p$ of the channel 140B can vary based on the size of the plate 112 as well as the cross-sectional area of the resonators 120C and 120D. In particular, the characteristic dimension of the cross-sectional areas of the resonators 120C and 120D is between 15% to 20% of the width $w_p$ of the channel 140B. As mentioned previously, the width $w_p$ of each of the channels 140A-140D may be substantially similar.

The resonators 120C and 120D are shown to be attached to the channel 140B and are located on the top side 116A of the plate 112. However, similar to what was described in FIG. 3, the resonators 120C and/or 120D may be located on the bottom side 116B of the plate 112 and/or may be disposed such that the first resonator 120C is located on the top side 116A and the second resonator 120D is located on the bottom side 116B. However, the separation distance d between the first resonator 120C and the second resonator 120D should remain the same regardless of which side of the plate 112 the resonators 120C and 120D are located.

As previously explained when describing the resonator 20 of FIG. 4A, which is equally applicable to any of the resonators forming the pairs of resonators 118A-118D, the first resonator 120C and the second resonator 120D have resonant frequency substantially similar (within 20%) to the frequency of the flexural wave 114 acting upon the plate 112. In some cases, the resonant frequency of the first resonator 120C and the second resonator 120D may be greater than the frequency of the flexural wave 114, such as 5% greater.

The elongated slots 130A-130D and the perimeter 119 of the plate 112 guide the flexural wave 114 into the channels

140A-140D. When the flexural wave 114 reaches the channels 140A-140D, the monopole and dipole responses of the pairs of resonators 118A-118D cancel each other in a backward direction so that there is no reflection. While the resonators that form each of the pairs of resonators 118A-118D have constructive interference in the forward direction resulting in a scattered forward wave, the forward scattered wave cancels the incident wave in the forward direction beyond the resonators that form each of the pairs of resonators 118A-118D. In this way, the flexural wave 114 is fully absorbed by resonators that form each of the pairs of resonators 118A-118D.

Figure 7:
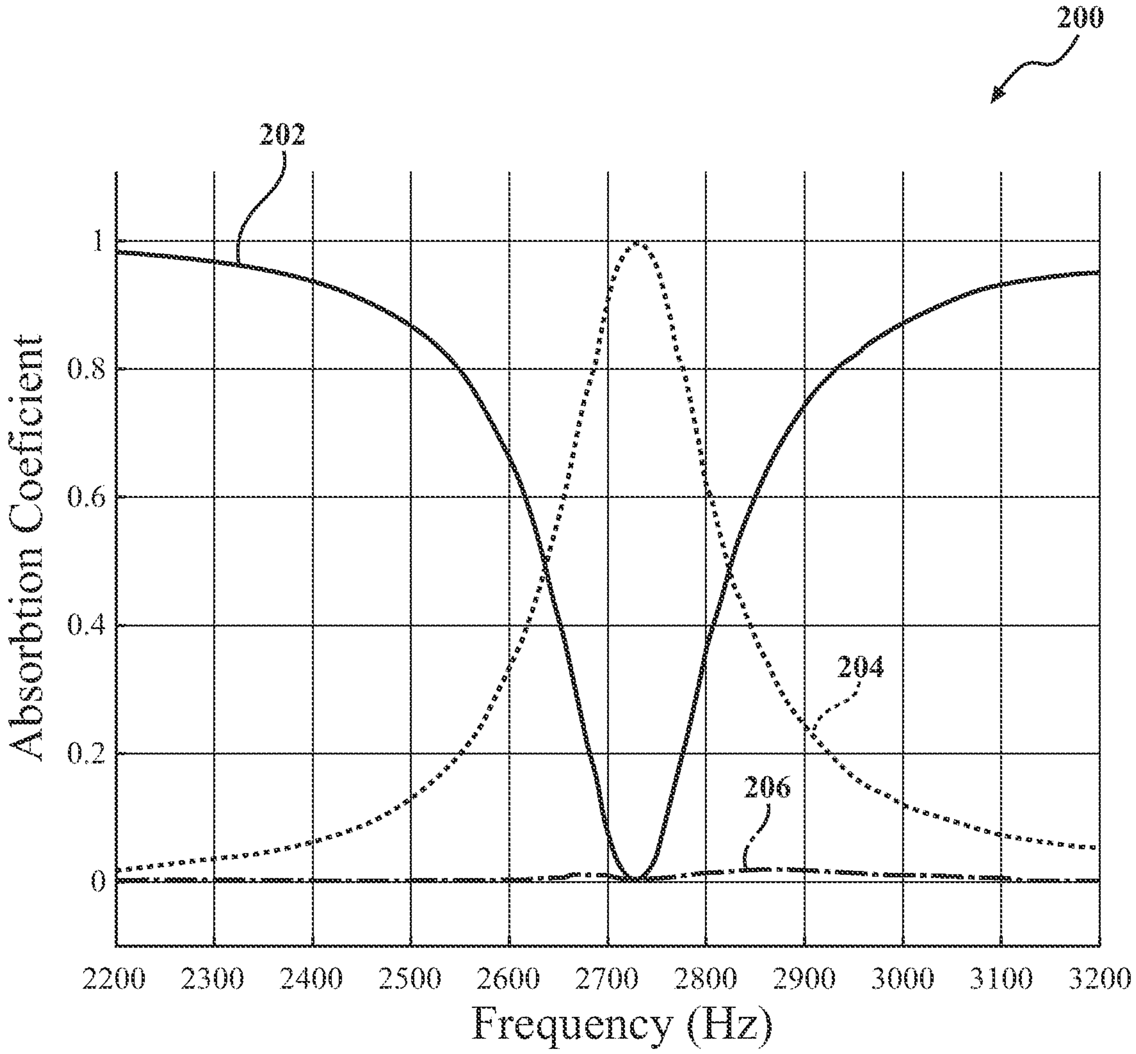
FIG. 7 illustrates the transmission, reflection, and absorption performance of the flexural wave absorption systems described herein.

To better illustrate the performance of the flexural wave absorption system 10 of FIG. 1 and/or the flexural wave absorption system 100 of FIG. 5, reference is made to FIG. 7. Here, illustrated are the transmission 202, absorption 204, and reflection 206 of flexural waves by a system similar to the flexural wave absorption systems 10 and/or 100. As shown in FIG. 7, there is near total absorption of flexural waves having a frequency of approximately 2725 Hz, with minimum reflection across all frequency ranges.

The preceding description is merely illustrative and is in no way intended to limit the disclosure, its application, or its uses. The phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments having stated features is not intended to exclude other embodiments having additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for absorbing a flexural wave acting on a structure, the system comprising: a pair of resonators disposed on the structure and separated from each other by a separation distance; wherein the pair of resonators are arranged on the structure in a direction substantially similar to the direction of the flexural wave acting on the structure; wherein the separation distance is approximately one-quarter of a wavelength of the flexural wave acting on the structure, and wherein the structure has a top surface and a bottom surface, wherein one of the pair of resonators is disposed on the top surface of the structure and another of the pair of resonators is disposed on the bottom surface of the structure.

2. The system of claim 1, wherein a resonant frequency of the pair of resonators is approximately substantially equal to or greater than a frequency of the flexural wave acting on the structure.

3. The system of claim 2, wherein the resonant frequency of the pair of resonators is approximately 5% greater than the frequency of the flexural wave acting on the structure.

4. The system of claim 1, wherein at least one of the pair of resonators comprises:

a solid member acting as a mass; and a flexible member attached to a side of the solid member, the flexible member acting as a spring and damper.

5. The system of claim 4, wherein the flexible member is attached to the structure, the flexible member being located between the structure and the solid member.

6. The system of claim 4, wherein the solid member has a cross-sectional area that is based on a width of the structure.

7. The system of claim 6, wherein the structure is a beam, wherein the cross-sectional area of the solid member is based on a width of the beam.

8. The system of claim 6, wherein the cross-sectional area of the solid member is substantially circular.

9. The system of claim 6, wherein the cross-sectional area of the solid member is substantially equal to a cross-sectional area of the flexible member.

10. A system for absorbing a flexural wave acting on a structure, the system comprising:

at least one elongated slot formed within plate structure and extending in a direction substantially similar to a direction of the flexural wave acting on the structure, a channel being formed in the structure between the at least one elongated slot and another elongated slot or a perimeter of the structure;

a pair of resonators disposed on the structure and separated from each other by a separation distance, the pair of resonators being disposed on the channel;

wherein the pair of resonators are arranged on the structure in a direction substantially similar to the direction of the flexural wave acting on the structure; and wherein the separation distance is approximately one-quarter of a wavelength of the flexural wave acting on the structure.

11. The system of claim 10, wherein the structure has a top side and a bottom side, wherein one of the pair of resonators is disposed on the top side of the structure on the channel and another of the pair of resonators is disposed on the bottom side of the structure on the channel.

12. The system of claim 10, wherein a resonant frequency of the pair of resonators is approximately substantially equal to or greater than a frequency of the flexural wave acting on the structure.

13. The system of claim 12, wherein the resonant frequency of the pair of resonators is approximately 5% greater than the frequency of the flexural wave acting on the structure.

14. The system of claim 10, wherein at least one of the pair of resonators comprises:

a solid member acting as a mass; and a flexible member attached to a side of the solid member, the flexible member acting as a spring and damper.

15. The system of claim 14, wherein the flexible member is attached to the structure, the flexible member being located between the structure and the solid member.

16. The system of claim 14, wherein the solid member has a cross-sectional area that is based on a width of the structure.

17. The system of claim 16, wherein the structure is a plate, wherein the cross-sectional area of the solid member is based on a width of the channel.

18. The system of claim 16, wherein the cross-sectional area of the solid member is substantially circular.

19. The system of claim 16, wherein the cross-sectional area of the solid member is substantially equal to a cross-sectional area of the flexible member.

* * * * *